(12) United States Patent
Fujima et al.

(10) Patent No.: US 10,699,581 B2
(45) Date of Patent: Jun. 30, 2020

(54) SMALL BOAT NAVIGATION ASSIST SYSTEM

(71) Applicant: Honda Motor Co., Ltd., Tokyo (JP)

(72) Inventors: Akifumi Fujima, Wako (JP); Ryuichi Kimata, Tokyo (JP); Takashi Hashizume, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 15/934,618

(22) Filed: Mar. 23, 2018

(65) Prior Publication Data

US 2018/0286251 A1 Oct. 4, 2018

(30) Foreign Application Priority Data

Mar. 29, 2017 (JP) .................. 2017-064060

(51) Int. Cl.
| | |
|---|---|
| *G08G 3/02* | (2006.01) |
| *G01C 21/20* | (2006.01) |
| *G06T 19/00* | (2011.01) |
| *B63B 49/00* | (2006.01) |
| *G05D 1/02* | (2020.01) |
| *B63B 43/18* | (2006.01) |
| *B63B 79/00* | (2020.01) |

(52) U.S. Cl.
CPC .............. *G08G 3/02* (2013.01); *B63B 49/00* (2013.01); *G01C 21/20* (2013.01); *G01C 21/203* (2013.01); *G05D 1/0206* (2013.01); *G06T 19/006* (2013.01); *B63B 43/18* (2013.01); *B63B 79/00* (2020.01)

(58) Field of Classification Search
CPC .............................. G01C 21/20; G06T 19/006
USPC ........................................................ 701/301
See application file for complete search history.

(56) References Cited

FOREIGN PATENT DOCUMENTS

| JP | H0747992 | * | 2/1995 |
| JP | H0747992 A | | 2/1995 |

* cited by examiner

*Primary Examiner* — Maceeh Anwari
(74) *Attorney, Agent, or Firm* — Duft & Bornsen, PC

(57) ABSTRACT

A server provides necessary data including at least map data and weather data for an ocean area to be navigated by a boat, and its AR-display data generating unit AR-displays a destination of the boat on captured forward-looking images displayed on a display of an information communication terminal at every via-target-point en route. And a server navigation data learning unit sequentially receives navigation data of the outboard motor from the terminal and learns navigation data that enables to reduce fuel consumption rate of an engine mounted on the outboard motor, and a server operation assist unit transmits the learned navigation data to the terminal so as to assist the operator's operation of the outboard motor accordingly.

18 Claims, 13 Drawing Sheets

SMALL BOAT NAVIGATION ASSIST SYSTEM

CROSS-REFERENCE TO RELATED APPLICATION

This application is based upon and claims the benefit of priority from Japanese Patent Application No. 2017-064060 filed on Mar. 29, 2017, the contents of which are incorporated herein by reference.

BACKGROUND OF THE INVENTION

Field of the Invention

This invention relates to navigation assist system for a small boat such as a motorboat or other small craft.

Description of the Related Art

When piloting a motorboat or other small craft equipped with an outboard motor fitted with an internal combustion engine, it is convenient to be able to easily visually spot target points en route to the destination because this enables target points to be reached at a low fuel consumption rate. This is a matter of particular interest to a for-profit taxi-boat business or the like.

Regarding this point, Japanese Unexamined Patent Publication No. H7 (1995)-47992A proposes a technology that detects a boat's position, displays an electronic nautical chart corresponding to the position, determines danger of running aground from water depth and other data of the electronic nautical chart, and issues aground warning when distance between the subject boat position and a shoal comes within a danger of aground distance.

Although the technology described in the reference is configured so that aground danger can be avoided, the configuration is complicated and does not make target points en route easily visible to an operator (pilot).

With a small boat, moreover, fuel consumption rate varies with hull resistance and also increases and decreases depending on outboard motor operation, so that fuel consumption rate is preferably reduced to the utmost possible taking these points into consideration.

SUMMARY OF THE INVENTION

An object of this invention is therefore to overcome the aforesaid problems by providing a small boat navigation assist system that enables an operator to simply spot target points en route visually and reduces fuel consumption to the utmost possible.

In order to achieve the object, this invention provides a small boat navigation assist system, comprising: a small boat equipped with an outboard motor fitted with an internal combustion engine; an electronic control unit installed in the outboard motor to control operation of the outboard motor; a server configured to provide information including at least map data and weather data of an ocean area where the small boat navigates and an information communication terminal configured to be operable by an operator on the small boat and having; a display; a self-position detecting unit configured to detect and display on the display self-position of the small boat; an imaging unit configured to image ahead of the small boat and display captured forward-looking images on the display; and a telecommunication unit configured to communicate with the electronic control unit and the server; wherein the server comprising: an AR-display data generating unit configured to generate AR-display data for AR-displaying a destination of the small boat in the ocean area at every via-target-point en route on the captured forward-looking images to be displayed on the display and transmit the AR-display data to the information communication terminal; a navigation data learning unit configured to sequentially receive navigation data of the outboard motor from the information communication terminal and learn navigation data that enables to reduce fuel consumption rate of the engine fitted in the outboard motor; and an operation assist unit configured to transmit the learned navigation data to the information communication terminal to assist operation of the operator of the outboard motor in accordance with the transmitted navigation data.

DETAILED DESCRIPTION OF THE INVENTION

A small boat navigation assist system according to an embodiment of this invention is explained with reference to the attached drawings in the following.

Figure 1:
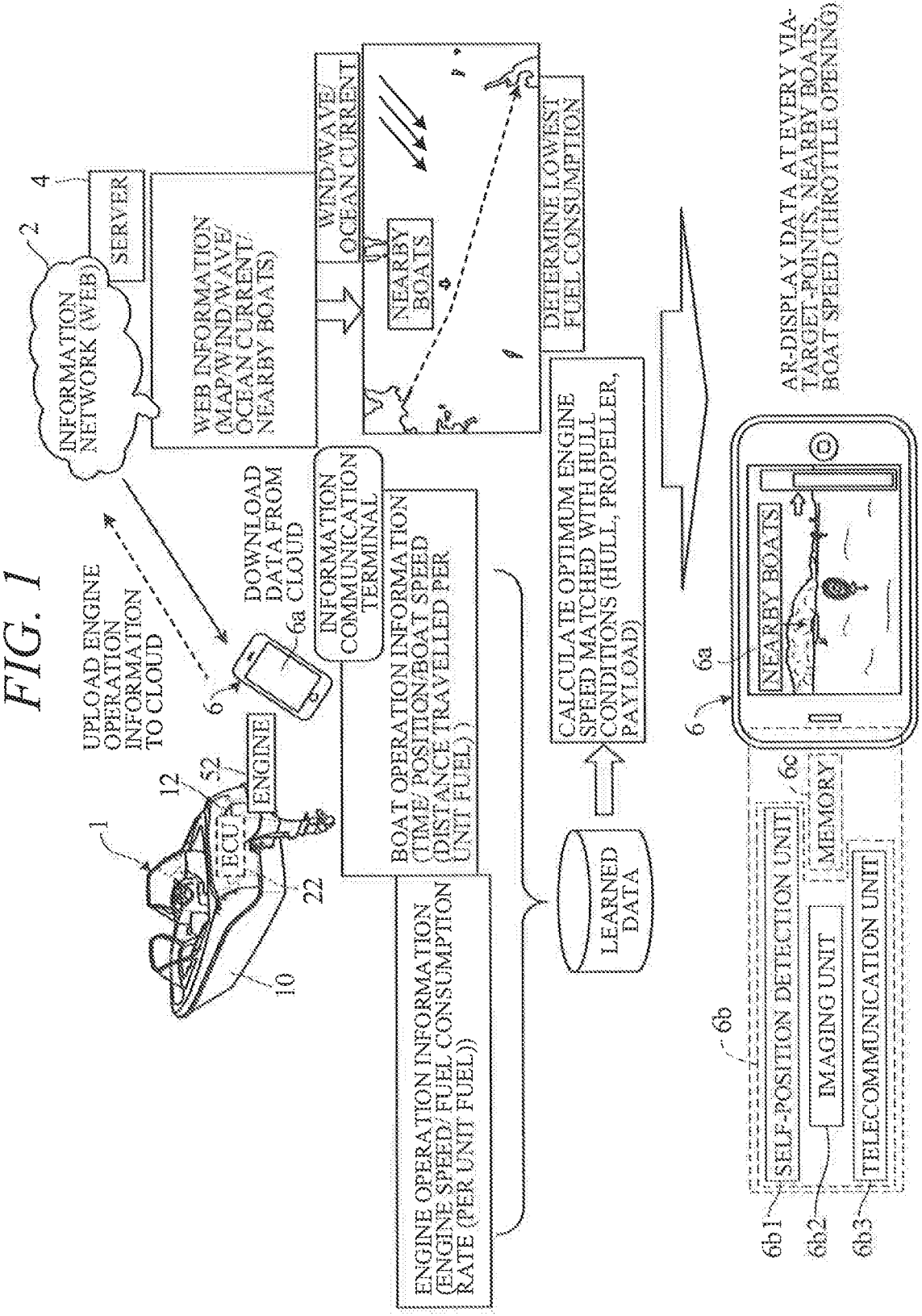
FIG. 1 is a schematic diagram generally illustrating a small boat navigation assist system according to an embodiment of this invention.
Figure 2:
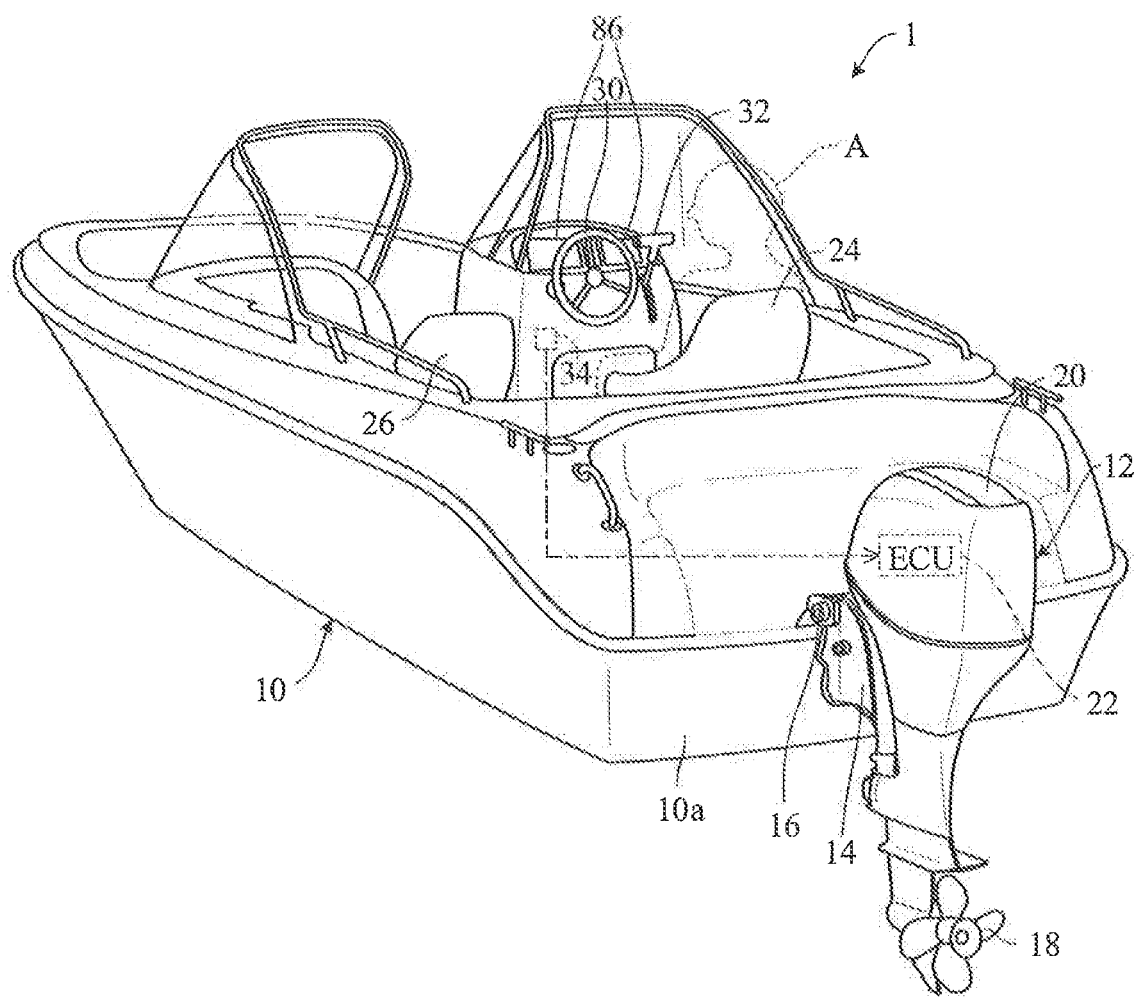
FIG. 2 is a perspective view of the small boat of FIG. 1.
Figure 3:
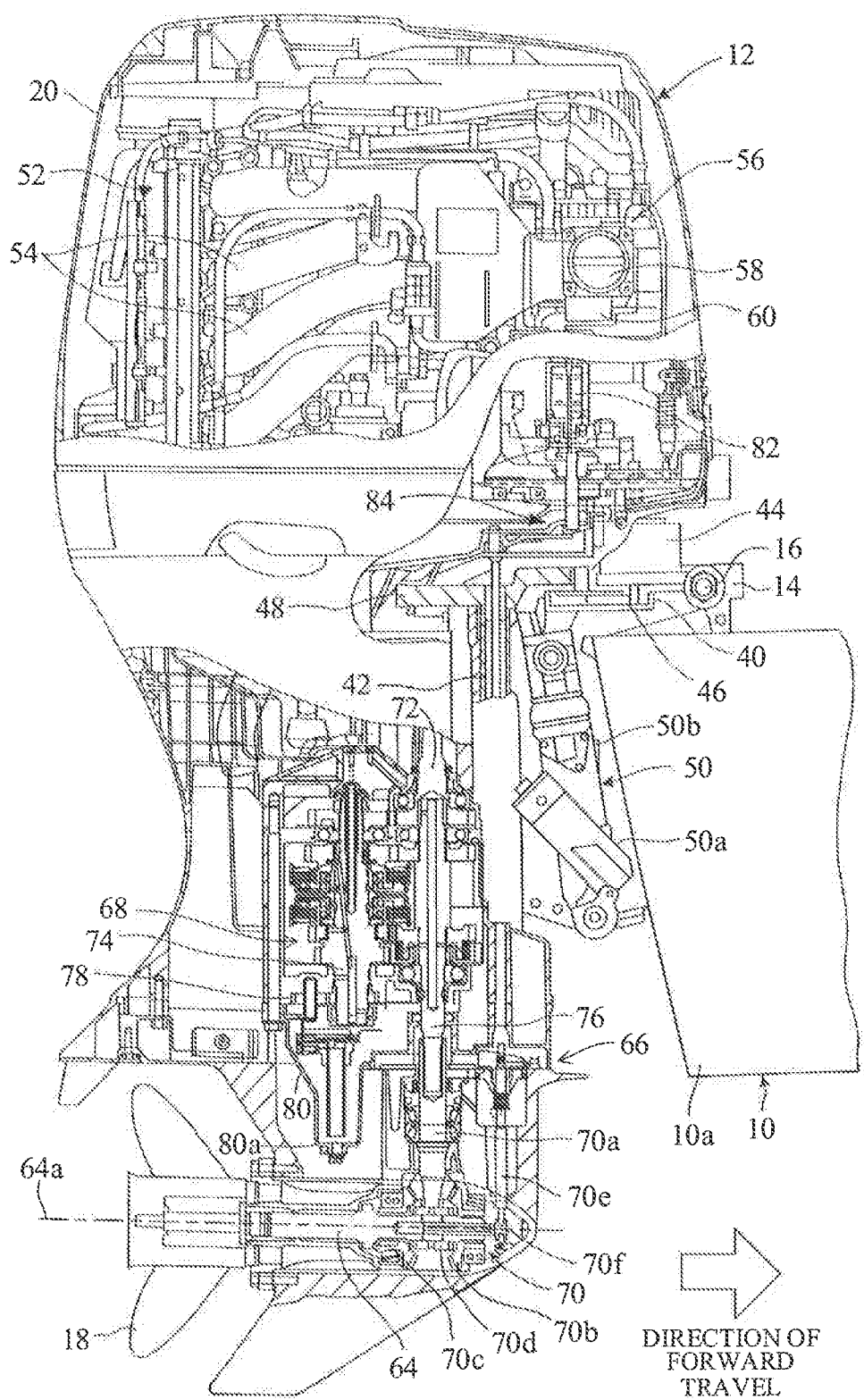
FIG. 3 is an enlarged side view of an outboard motor mounted on the small boat of FIG. 2.
Figure 4:
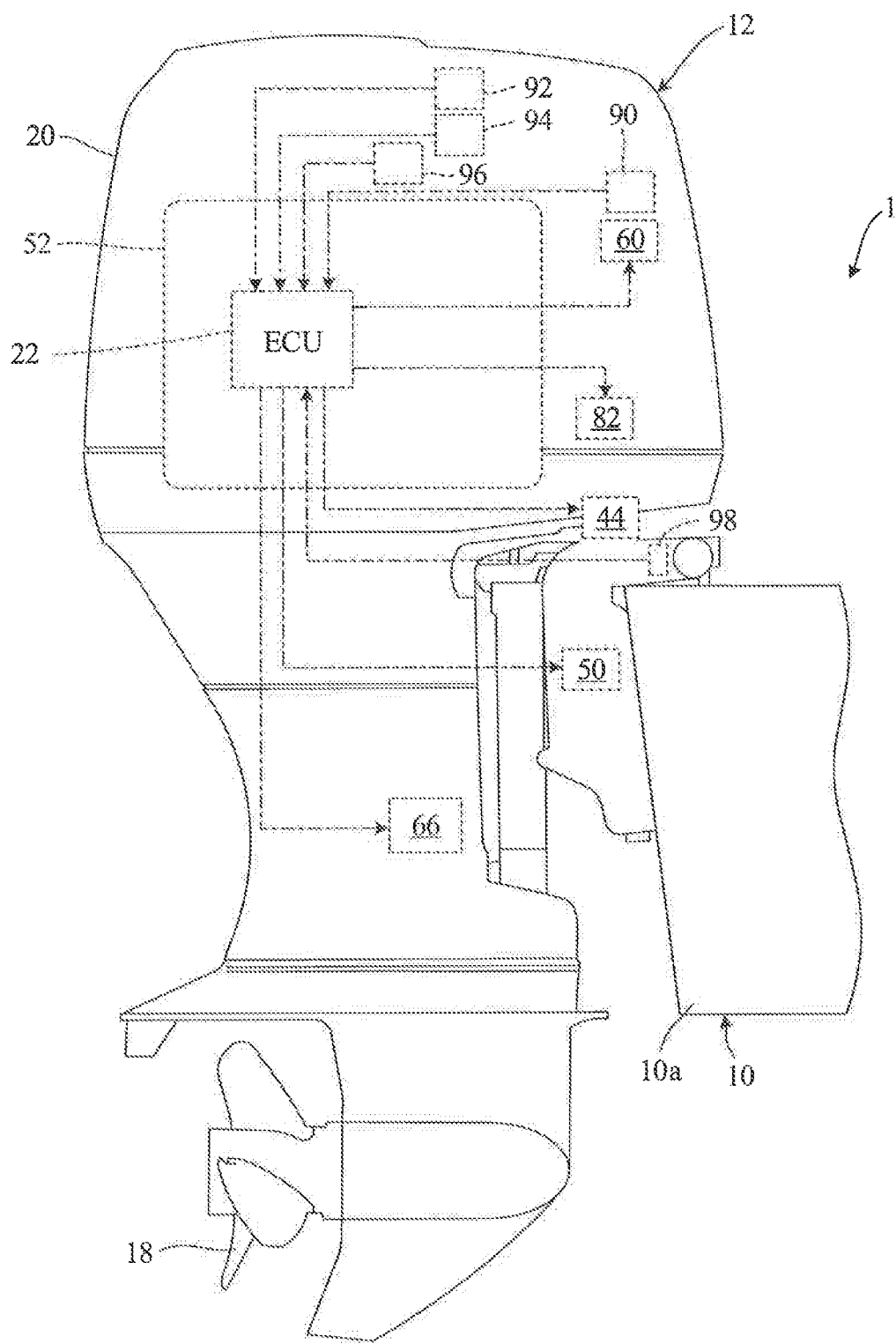
FIG. 4 is an explanatory diagram of an essential part of the outboard motor of FIG. 3.

FIG. 1 is a schematic diagram generally illustrating a small boat navigation assist system according to an embodiment of this invention; FIG. 2 is a perspective diagram of the small boat of FIG. 1; FIG. 3 is an enlarged side view of an outboard motor (partially in section) mounted on the small boat of FIG. 2; and FIG. 4 is an explanatory diagram of an essential part of the outboard motor.

Reference numeral 1 in FIG. 1 designates a small boat (hereinafter called "boat"). For convenience of explanation in the following, the boat 1 will be explained first with reference to FIG. 2. As illustrated, the boat 1 is actually a motorboat, and a case in which it is a commercial motorboat owned by a taxi-boat company is taken as an example. The taxi-boat company is engaged in a coastal area business of offering customers transport service to requested destinations by boat.

The boat 1 has a hull 10, and an outboard motor 12 is mounted on the hull 10. To be more specific, the outboard motor 12 is attached to a stern 10a of the hull 10 by means of stern brackets 14 and a tilting shaft 16.

The outboard motor 12 comprises an engine (internal combustion engine, described later), a propeller 18 driven by the engine, an engine cover 20 enclosing the engine, and an electronic control unit (hereinafter called ECU) 22 installed in an engine room, i.e., a space inside the engine cover 20, for controlling operation of the outboard motor 12. The ECU 22 comprises a microcomputer equipped with a processor (CPU), memories (ROM, RAM), and so on.

A cockpit seat 24 for an operator A (indicated by broken line) is provided at the fore-aft middle of the hull 10, and seats 26 for passengers are provided beside and behind the cockpit seat 24. A steering wheel 30 turnable by the operator is installed in the cockpit 24.

A shift-throttle lever 32 operable by the operator is installed near the cockpit seat 24. The shift-throttle lever 32 can be rocked fore and aft from an initial position by the operator to input forward/reverse instructions and engine speed NE regulation instructions, including acceleration/deceleration instructions, to the engine.

A GPS (Global Positioning System) receiver 34 for receiving GPS signals is installed at a suitable location on the hull 10. The GPS receiver 34 sends the ECU 22 signals indicating position data of the boat 1 obtained from the GPS signals.

FIG. 3 is an enlarged partially sectional side view of the outboard motor 12, and FIG. 4 is an enlarged side view of the outboard motor 12.

As shown in FIG. 3, the outboard motor 12 is equipped with a swivel shaft 42 accommodated inside a swivel case 40 to be rotatable around a vertical axis, and an electric steering motor 44. The electric steering motor 44 operates through a reduction gear mechanism 46 and a mount frame 48 to drive the swivel shaft 42, thereby rotating the swivel shaft 42. As a result, the outboard motor 12 is steered clockwise or counterclockwise (around a vertical axis) with the swivel shaft 42 as a steering axis.

A power tilt-trim unit 50 installed near the swivel case 40 enables adjustment of tilt angle or trim angle of the outboard motor 12 relative to the hull 10 by tilting up/down or trimming up/down.

The power tilt-trim unit 50 integrally comprises a hydraulic cylinder mechanism 50a for tilt angle adjustment and a hydraulic cylinder mechanism 50b for trim angle adjustment, and the hydraulic cylinder mechanisms 50a and 50b extend and retract to raise and lower the swivel case 40 around the tilting shaft 16 as an axis of rotation, thereby tilting or trimming the outboard motor 12 up and down. The hydraulic cylinder mechanisms 50a and 50b are connected to a hydraulic circuit (not shown) installed in the outboard motor 12 and are extended and retracted by hydraulic pressure received therefrom.

The outboard motor 12 is fitted with the engine (now assigned with reference numeral 52) at its upper portion. The engine 52 is a spark-ignition, water-cooled gasoline engine. The engine 52 is positioned above the water surface and enclosed by the engine cover 20.

A throttle body 56 is connected to an air intake pipe 54 of the engine 52. The throttle body 56 has an internal throttle valve 58 and an integrally attached electric throttle motor 60 for open-close driving the throttle valve 58.

An output shaft of the electric throttle motor 60 is connected through a reduction gear mechanism (not shown) to the throttle valve 58, and the electric throttle motor 60 is operated to open and close the throttle valve 58 so as to meter air intake of the engine 52 and thereby regulate engine speed NE.

The outboard motor 12 is supported to be rotatable around a horizontal shaft and is equipped with a propeller shaft 64 connected at one end to the propeller 18 for transmitting power to the propeller 18 from the engine 52 and a transmission 66 interposed between the engine 52 and propeller shaft 64 and having first, second and optionally additional gear positions.

An axis 64a of the propeller shaft 64 is oriented to lie substantially parallel to the water surface when the power tilt-trim unit 50 is in initial state (state when trim angle is initial angle). The transmission 66 comprises a speed-change mechanism 68 shiftable among multiple speeds and a shift mechanism 70 whose shift position can be changed among a forward position, a reverse position and a neutral position.

The speed-change mechanism 68 is constituted as a parallel-shaft stepped speed-change mechanism having, arranged in parallel, an input shaft 72 connected to a crankshaft (not shown) of the engine 52, a countershaft 74 connected to the input shaft 72 through gears, and an output shaft 76 connected to the countershaft 74 through multiple gears.

A hydraulic pump 78 for pumping hydraulic oil (lubricating oil) to a hydraulic clutch for gear shifting and lubrication points is connected to the countershaft 74. The input shaft 72, countershaft 74, output shaft 76 and hydraulic pump 78 are housed in a case 80, and a lower part of the case 80 constitutes an oilpan 80a for receiving hydraulic oil.

The shift mechanism 70 is connected to the output shaft 76 of the speed-change mechanism 68 and comprises a drive shaft 70a rotatably supported to lie parallel to the vertical axis, a forward bevel gear 70b and a reverse bevel gear 70c that are connected to and rotated by the drive shaft 70a, and a clutch 70d capable of engaging the propeller shaft 64 with either the forward bevel gear 70b or the reverse bevel gear 70c.

A shift electric motor 82 for driving the shift mechanism 70 is installed inside the engine cover 20, and its output shaft is adapted to be connectable via a reduction gear mechanism 84 to an upper end of a shift rod 70e of the shift mechanism 70. Therefore, when the shift electric motor 82 is driven to suitably displace the shift rod 70e and a shift slider 70f, the clutch 70d operates to change the shift position among forward position, reverse position and neutral position.

When the shift position is forward position or reverse position, rotation of the output shaft 76 of the speed-change mechanism 68 is transmitted through the shift mechanism 70 to the propeller shaft 64, whereby the propeller 18 is rotated to produce propulsion (propelling force) in the forward or reverse direction of the hull 10. The outboard motor 12 is further equipped with an electric power supply, such as a battery, attached to the engine 52, and operating power is supplied to the motors 44, 60 and 82 and other destinations from this power supply.

As shown in FIG. 2, a display 86 for displaying an ocean area to be navigated is provided near the cockpit seat 24.

A throttle position sensor 90 installed near the throttle valve 58 as shown in FIG. 4 produces an output indicating opening (angle) TH of the throttle valve 58. Further, a crankangle sensor 92 attached near the crankshaft of the engine 52 outputs a pulse signal every predetermined crankangle.

An engine temperature sensor 94 disposed on a cylinder wall surface of the engine 52 produces an output indicating engine temperature of the engine 52, and an intake air pressure sensor 96 disposed at a suitable location on the air intake pipe 54 of the engine 52 outputs a signal indicating absolute pressure inside the air intake pipe 54 (engine load).

A trim angle sensor 98 disposed near the tilting shaft 16 produces an output proportional to trim angle of the outboard motor 12 (rotation angle around a pitch axis of the outboard motor 12 relative to the hull 10).

Returning to the explanation of FIG. 1, a navigation assist system of the small boat according to this embodiment is installed on the outboard motor 12 and boat 1 equipped with the outboard motor 12 fitted with the engine 52, and comprises, in addition to the ECU 22 for controlling operation of the outboard motor 12, a server 4 on a cloud 2 which can provide data including at least map data and weather data for an ocean area to be navigated by the boat, plus an information communication terminal (hereinafter sometimes called "terminal") terminal 6.

The server 4 is an ordinary mainframe computer having processors and memories installed at a facility of the applicant, for example. As mentioned earlier, the boat 1 is a commercial motorboat owned by a taxi-boat company.

In actual practice, the terminal 6 is a smartphone that can be operated by the operator on the boat 1 and comprises a display 6a, a processor (CPU) 6b and a memory (ROM, RAM) 6c coupled to the processor 6b. The processor 6b has a self-position detection unit 6b1 similar to that of the aforesaid GPS receiver 34 configured to detect self-position by means of an internal GPS receiver and display it on the display 6a, an imaging unit 6b2 configured to image ahead and display captured forward-looking images, preferably forward-looking video images, on the display 6a, and a telecommunication unit 6b3 configured to communicate with the ECU 22 via a short-distance wireless technology like Bluetooth®, and communicate with the server 4 on the cloud 2 through a mobile telephone communication network, a public telephone communication network, or the like.

As shown in FIG. 1, the server 4 can acquire data on the information network (Web) of the cloud 2, specifically, data including at least map data, wind data, wave data (significant wave height data), and ocean current data for an ocean area to be navigated by the boat 1, plus information regarding other boats navigating in the vicinity.

Figure 5:
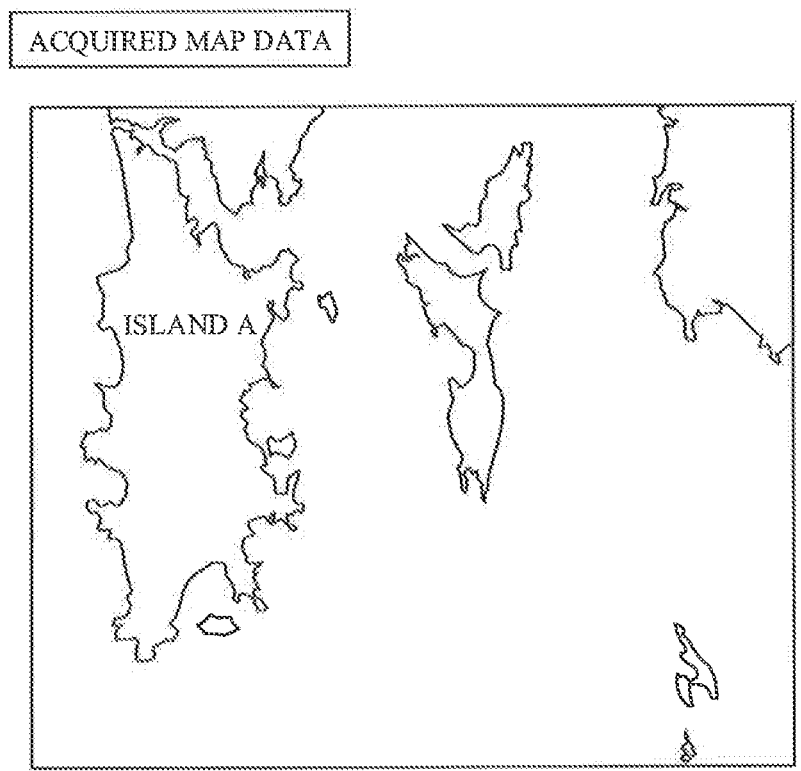
FIG. 5 is an explanatory view showing map data acquirable from a server of FIG. 1.
Figure 6:
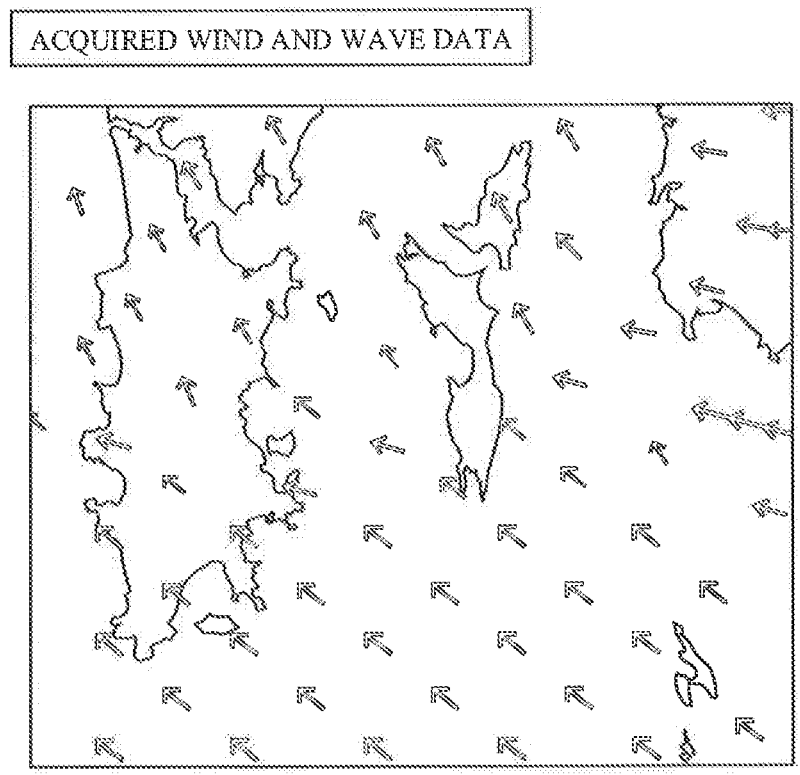
FIG. 6 is an explanatory view showing wind and wave data provided from the server of FIG. 1.
Figure 7:
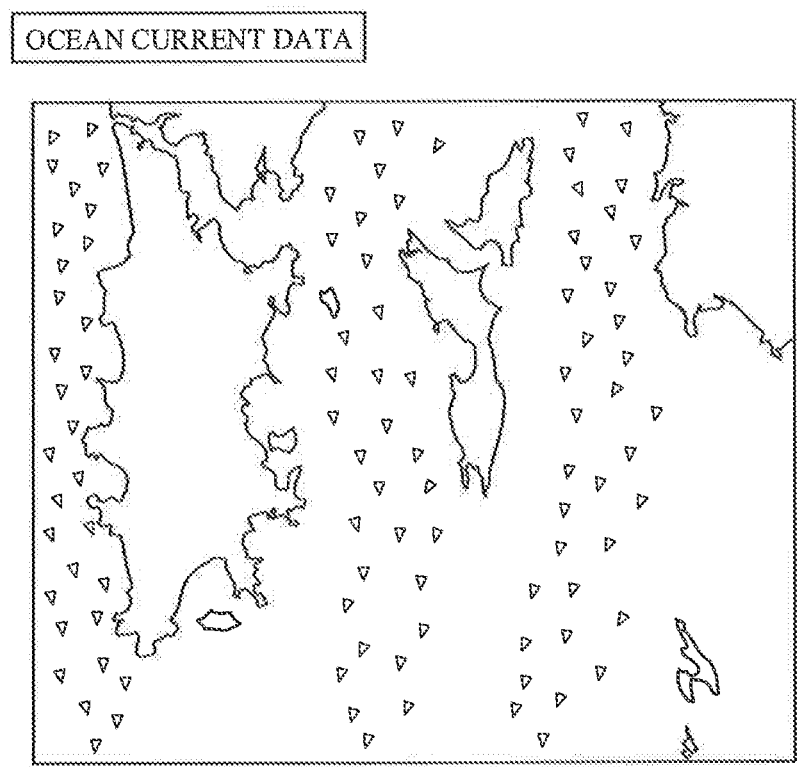
FIG. 7 is an explanatory view showing ocean current data provided from the server of FIG. 1.
Figure 8:
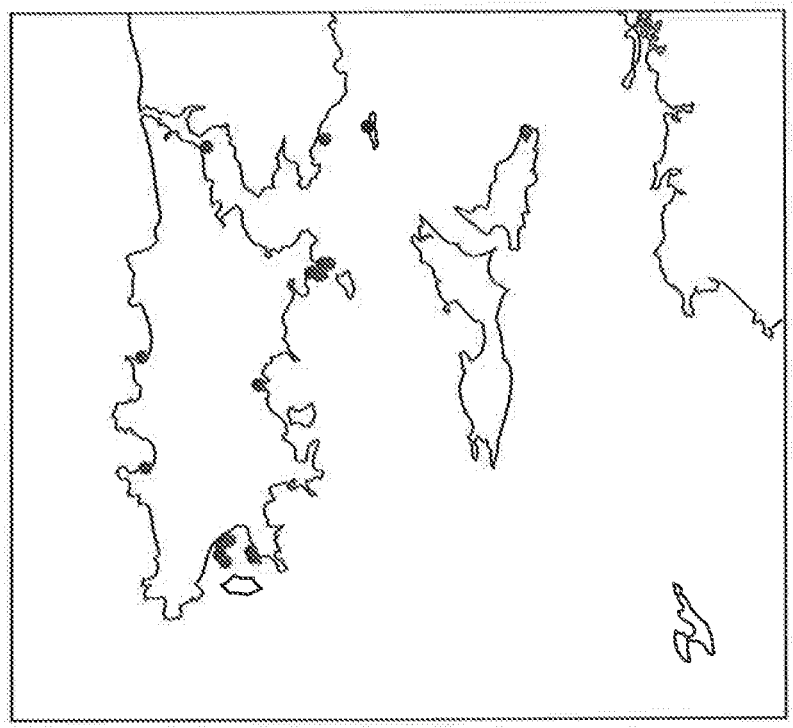
FIG. 8 is an explanatory view showing other boat information provided from the server of FIG. 1.

FIG. 5 shows acquired map data, FIG. 6 wind and wave data, FIG. 7 ocean current data, and FIG. 8 information on other boats navigating nearby. Other boats are indicated by black dots in FIG. 8.

Figure 9:
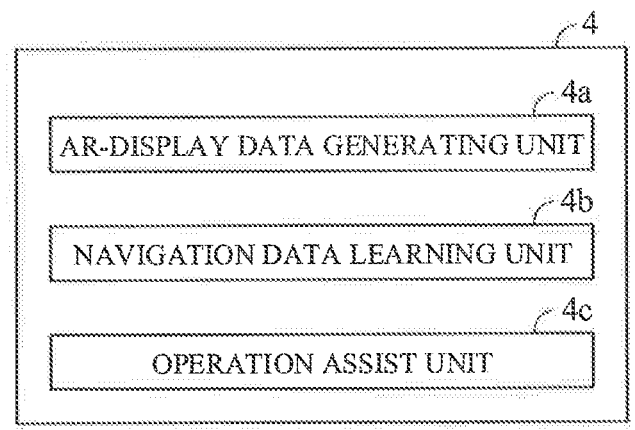
FIG. 9 is a block diagram showing processing by the server of FIG. 1.

FIG. 9 is an explanatory diagram functionally illustrating processing performed by the server 4. As shown, the server 4 comprises a processing unit including an AR-display data generating unit 4a, a navigation data learning unit 4b, and an operation assist unit 4c. In other words, the processors and memories of the server 4 are configured to perform AR-display data generating, navigation data learning and operation assist.

Figure 10:
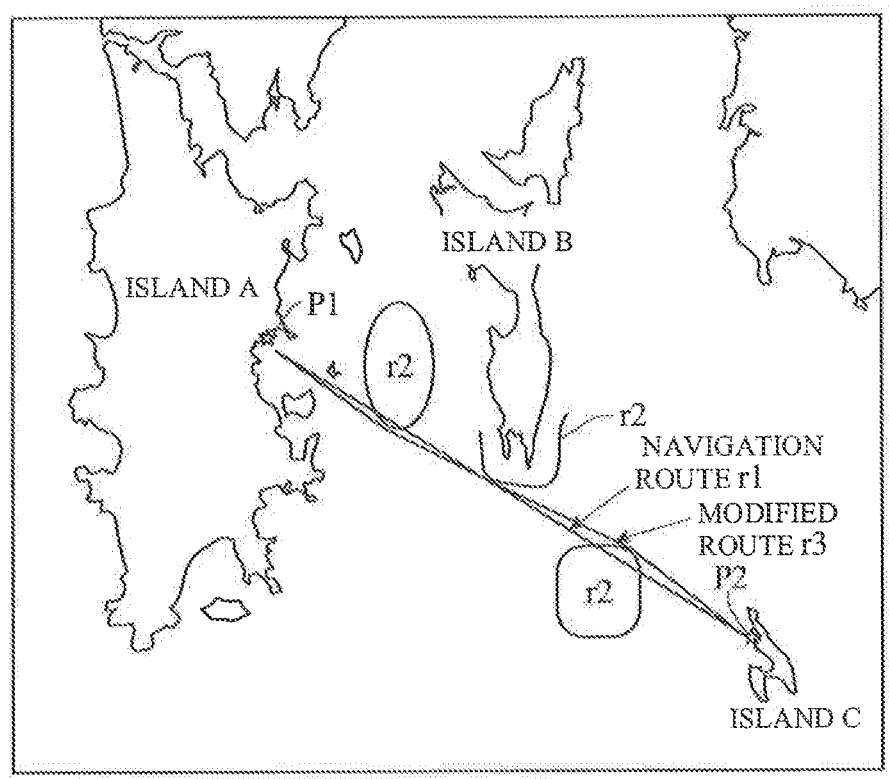
FIG. 10 is an explanatory diagram showing processing by an AR-display data generating unit of FIG. 9.

The AR-display data generating unit 4a configured to provisionally determine a navigation route r1 along a straight line between a departure point P1 and destination P2 of the boat 1, as shown in FIG. 10, determine whether the provisionally determined navigation route r1 includes an area to be avoided, define an avoid area r2 when the determination is affirmative, and set a modified route r3 by modifying the provisionally determined navigation route r1 based on the defined avoid area r2.

By "avoid area" is meant a region read from the map data that is not sea (a peninsula, island or similar), a shoal region, a region where, in view of the wave data (significant wave height data), wave height is apt to be at least as high as a predetermined level unsuitable for navigation, or a region where, in view of the information on other boats navigating in the vicinity, a large ship is likely to be anchored or is likely to be at the subject boat's landing place when it arrives. The subject boat's landing place is estimated from the navigation route r1, throttle opening TH (boat speed V equivalent value) and clock time, and other nearby boats are estimated from clock time and boat speed vectors.

Figure 11:
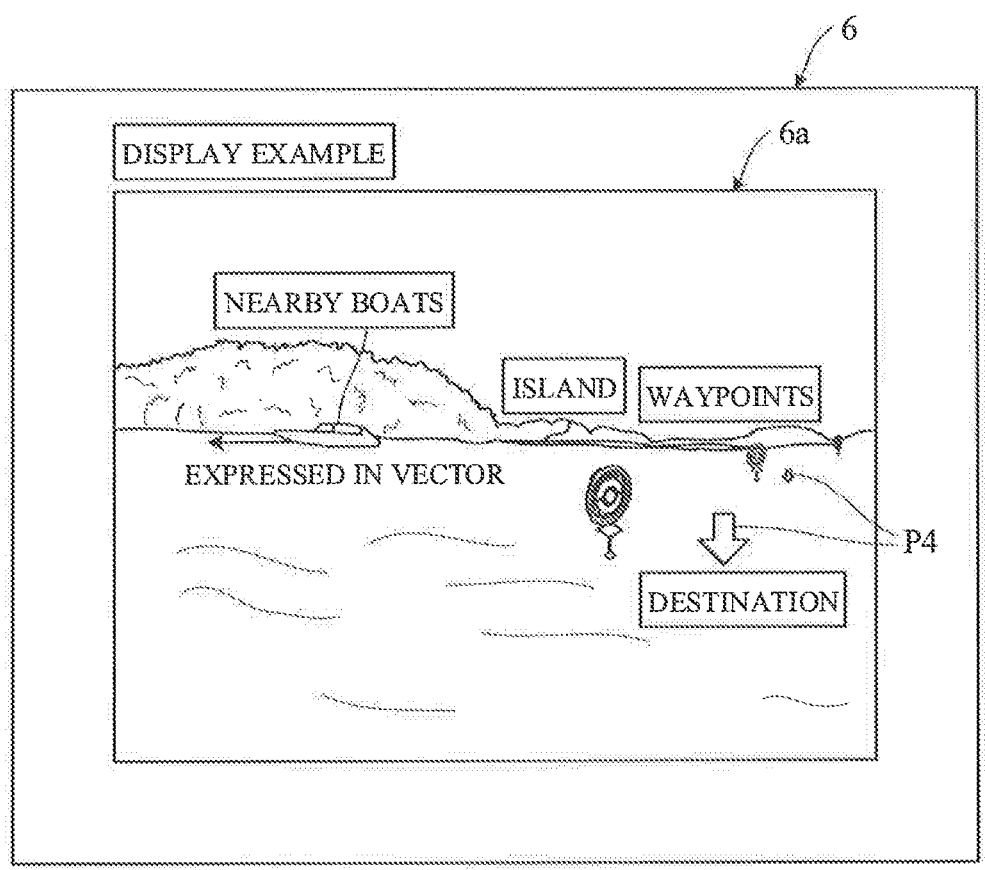
FIG. 11 is an explanatory diagram also showing processing by the AR-display data generating unit of FIG. 9.

Moreover, the AR-display data generating unit 4a generates and transmits to the terminal 6 AR-display data at every via-target-point P4 en route to the destination of the boat 1 for AR-display on captured forward-looking images obtained as images looking ahead of the boat 1 taken by the operator and displayed on the display 6a, as shown at the bottom of FIG. 1 and in FIG. 11.

AR stands for Augmented Reality, and when display data are generated using AR technology and the operator steers toward successive via-target-points P4, the boat 1 passes through waypoints following the via-target-points P4, whereby the navigation route (and destination) are easy to distinguish visually and running time is minimized.

Figure 12:
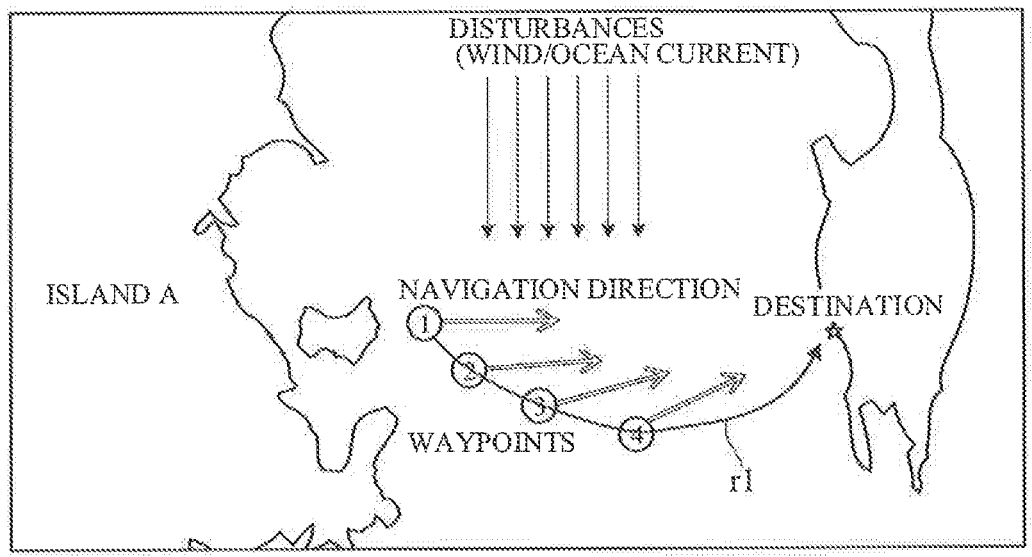
FIG. 12 is an explanatory diagram also showing processing by the AR-display data generating unit of FIG. 9.
Figure 13:
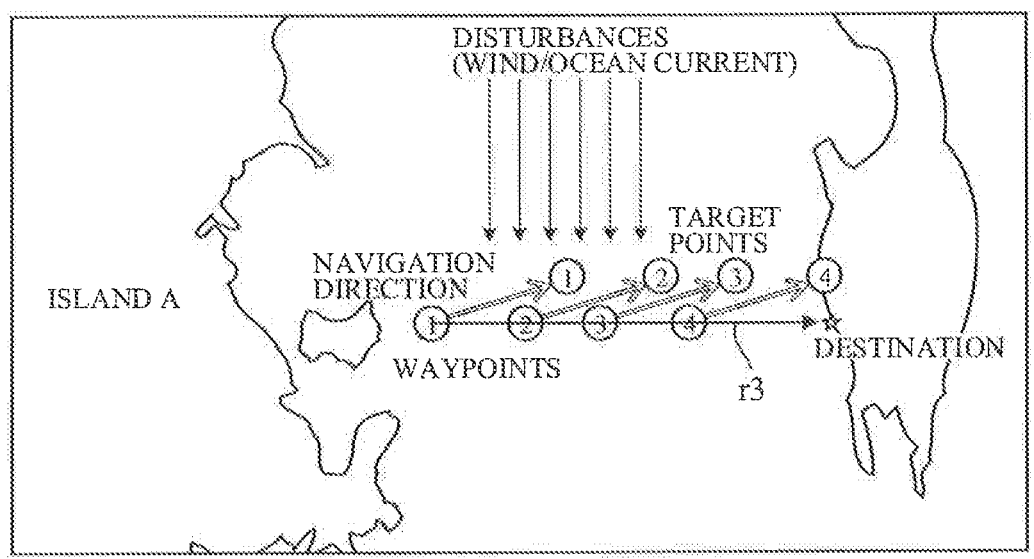
FIG. 13 is an explanatory diagram also showing processing by the AR-display data generating unit of FIG. 9.

In other words, the AR-display data generating unit 4a is configured to predict disturbances, including at least wind and ocean currents, on the navigation route r1 (or modified route r3), as shown in FIG. 12, and to calculate navigation direction of the boat 1 and composite force of predicted disturbances and set the modified route r3 by modifying the navigation route r1 (or modified route r3) to coincide with the direction of the calculated composite force, as shown in FIG. 13.

Since at this time, as stated above, the destination of the boat 1 is AR-displayed on the captured forward-looking images of the display 6a at every via-target-point P4 en route, the boat 1 passes through waypoints following the via-target-points P4 so long as the operator navigates toward the via-target-points P4, whereby the navigation route is easy to distinguish visually and running time is minimized.

Returning to the explanation of FIG. 9, the navigation data learning unit 4b sequentially receives navigation data of the outboard motor 12 from the terminal 6 and learns navigation data that reduce fuel consumption rate of the engine 52 fitted in the outboard motor 12.

Figure 14:
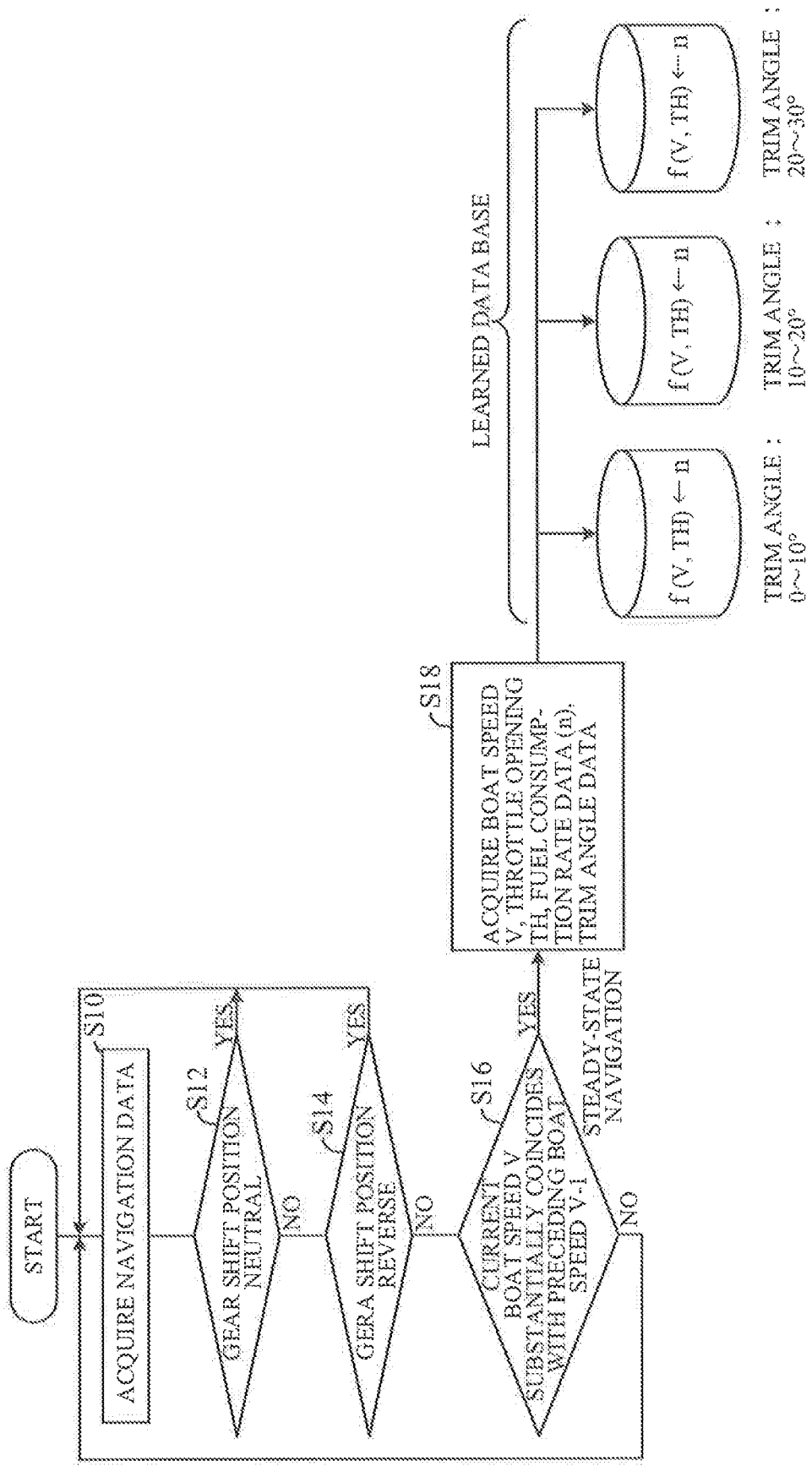
FIG. 14 is a flowchart showing processing by a navigation data learning unit of FIG. 9.

FIG. 14 is a flowchart showing this processing. The illustrated program is repeatedly executed at predetermined time intervals (n) of, for example, 1 sec.

Turning now to a detailed explanation, in S10 (S: processing step), the navigation data learning unit 4b acquires navigation data from the ECU 22 via the terminal 6, and the program then goes to S12 to determine whether shift position of the shift mechanism 70 of the outboard motor 12 is neutral. When the result in S12 is NO, the program goes to S14, in which it is determined whether the shift mechanism 70 is in reverse position and the boat 1 is moving backwards.

When the result in S12 or S14 is YES, the boat 1 is determined to be standing or moving backwards, i.e., not moving forward, so the program returns to S10, while when the result is NO in both S12 and S14, the program goes to S16, in which it is determined whether current boat speed V coincides (substantially) with preceding boat speed V−1 (here, "current" means data in the current program loop and "preceding" in the preceding program loop). Specifically, it is determined whether the boat 1 navigates forward in steady-state (a constant speed). Boat speed V is detected from value of engine speed NE detected by the crankangle sensor 92 using an appropriate conversion factor.

On the other hand, when the result in S16 is YES, the boat 1 is determined to be navigated forward in steady-state, so the program goes to S18, in which boat speed (proportional to engine speed NE) V and throttle opening (degree of shift-throttle lever 32 tilt by operator) TH data, fuel consumption rate data, and trim angle data are acquired. Detection value of the throttle position sensor 90 is used as the throttle opening TH, and detection value of the trim angle sensor 98 is used as the trim angle.

Namely, boat speed V and throttle opening TH data when the boat 1 is navigating forward normally are stored in memory in sets so their relationship can be examined, and fuel consumption rate at the time is calculated and stored in memory.

Simultaneously, power tilt-trim unit 50-adjusted trim angle data are read, and sets of boat speed V and throttle opening TH are accumulated in a learned database in association with individual trim angle data of different ranges.

Trim angle is divided into three ranges: less than 10 degrees, 10 degrees to less than 20 degrees, and 20 degrees to less than 30 degrees. As the flowchart of FIG. 14 is looped every predetermined time interval (n), data are accumulated sequentially at time intervals of n.

Figure 15:
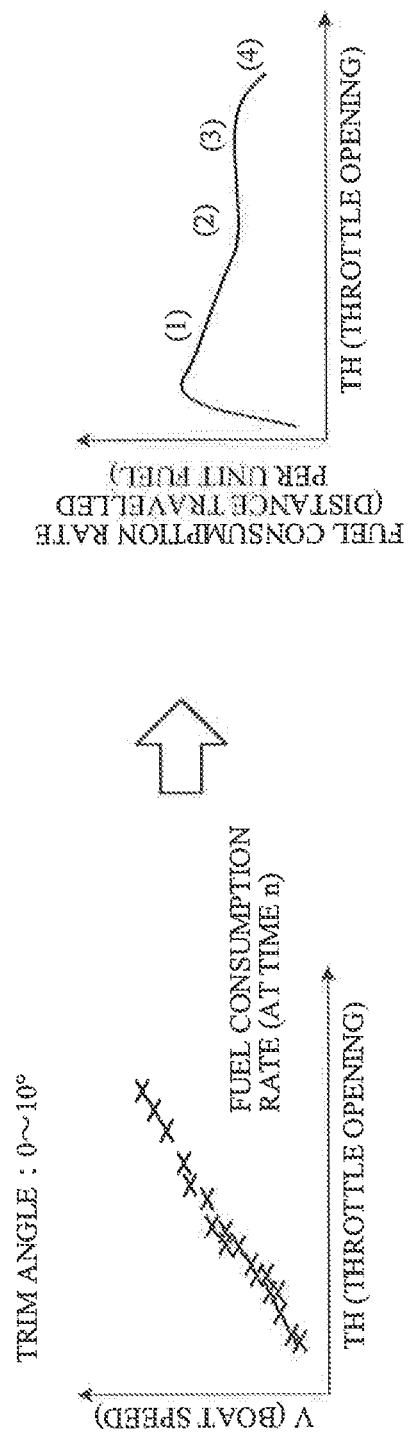
FIG. 15 is an explanatory diagram for explaining processing shown by the flowchart of FIG. 14.

FIG. 15 is an explanatory diagram showing (on left side) characteristics indicating how boat speed V varies with throttle opening TH when trim angle is less than 10 degrees and (on right side) characteristics based thereon indicating how fuel efficiency varies with throttle opening TH.

In FIG. 15, fuel efficiency is estimated from distance traveled per unit of fuel. Here, distance traveled is calculated from detection value of the GPS receiver 34 (or self-position detection value of the terminal 6).

Turning now to an explanation with reference to FIG. 15 of relationship between fuel economy and throttle opening, region (1) in FIG. 15 designates a region in which fuel economy is decreasing from peak value. The reason for this is that fuel economy peaks in the low speed region because resistance acting on the hull 10 increases in proportion to the square of boat speed V increase. In this region, the hull 10 navigates while submerged, so that fuel economy deteriorates in the anterior of (1) as boat speed V increases.

Region (2) is a region of inflection where deterioration of fuel economy levels off, and the region in which planing starts owing to generation of buoyant force on the hull 10 with increasing boat speed V. In region (3), the hull 10 is in planing condition and boat speed V has risen to a level where a good balance between boat speed V and fuel efficiency can be realized. In region (4), the hull 10 is planing but resistance on the hull 10 increases owing to higher boat speed V.

Since the processing from S10 to S18 of the flowchart of FIG. 14 is executed once every predetermine time interval (n), it is possible by repeating the processing a number of times (over a number of time intervals) to determine the engine speed of the engine 52 that achieves optimal fuel efficiency (minimizes fuel consumption rate) under existing hull 10 conditions (shape of hull 10 itself and propeller 18, and payload, i.e., operator and passenger body weight, and other loads), specifically the engine speed of the engine 52 that realizes region (3) in FIG. 15.

Thus, the navigation data learning unit 4b is supplied by the terminal 6 with the throttle opening TH corresponding to the boat speed V when the boat 1 is cruising and learns the fuel consumption rate as the fuel efficiency (fuel consumption rate) corresponding to the received throttle opening TH. More exactly, the navigation data learning unit 4b is supplied by the terminal 6 not only with the throttle opening TH corresponding to the boat speed V but also with the trim angle data of the outboard motor 12 when the boat 1 is cruising and learns the fuel consumption rate as the fuel efficiency (fuel consumption rate) corresponding to the received throttle opening TH at that trim angle.

Moreover, the operator can visually distinguish the navigation route with ease and running time can be minimized, because the AR-display data generating unit 4a AR-displays the destination of the boat 1 on the captured forward-looking images of the display 6a at every via-target-point P4 en route.

The operation assist unit 4c is configured to transmit navigation data it learns (learned data) to the terminal 6, and the transmitted navigation data are displayed on the display 6a of the terminal 6 or the display 86 of the hull 10, thereby assisting the operator's operation of the outboard motor 12, or the learned data are transmitted from the terminal 6 to the ECU 22 to be displayed on the display 6a or the display 86 of the hull 10 to assist the operator's operation of the outboard motor 12 by additionally supplying the operator through the ECU 22 with information regarding, inter alia, throttle opening TH that maximizes fuel efficiency.

As set out in the foregoing, this embodiment is configured to have a small boat navigation assist system, comprising: a small boat (1) equipped with an outboard motor (12) fitted with an internal combustion engine (52); an electronic control unit (22) installed in the outboard motor (12) to control operation of the outboard motor (12); a server (4) on a cloud (2) configured to provide information including at least map data and weather data of an ocean area where the small boat (1) navigates and an information communication terminal (6) configured to be operable by an operator on the small boat (1) and having; a display (6a); a self-position detecting unit (6b1) configured to detect and display on the display (6a) self-position of the small boat (1); an imaging unit (6b2) configured to image ahead of the small boat (1) and display captured forward-looking images on the display (6a); and a telecommunication unit (6b3) configured to communicate with the electronic control unit (22) and the server (4); wherein the server (4) comprises: an AR-display data generating unit (4a) configured to generate AR-display data for AR-displaying a destination of the small boat (1) in the ocean area at every via-target-point en route on the captured forward-looking images to be displayed on the display (6a) and transmit the AR-display data to the information communication terminal (6); a navigation data learning unit (4b; S10-S18) configured to sequentially receive navigation data of the outboard motor (12) from the information communication terminal (6) and learn navigation data that enables to reduce fuel consumption rate of the engine (52) fitted in the outboard motor (12); and an operation assist unit (4c) configured to transmit the learned navigation data to the information communication terminal (6) to assist operation of the operator of the outboard motor (12) in accordance with the transmitted navigation data.

More specifically, of data on an information network (Web), the server 4 provides necessary data from the cloud 2 of acquirable data including at least map data and weather data for an ocean area to be navigated by the boat 1, and its AR-display data generating unit 4a AR-displays the destination of the boat 1 in the ocean area on captured forward-looking images displayed on the display 6a of the terminal 6 at every via-target-point en route, whereby navigation can be assisted by enabling the operator to easily distinguish the navigation route at every via-target-point en route.

Moreover, a configuration is adopted wherein the navigation data learning unit 4b sequentially receives navigation data of the outboard motor 12 from the terminal 6 and learns navigation data that enables to reduce fuel consumption rate of the engine 52, and wherein the operation assist unit 4c transmits the learned navigation data to the terminal 6 so as to assist the operator's operation of the outboard motor 12 accordingly, whereby, for example, it becomes possible to assist operation by displaying learned navigation data on the display 6a of the terminal 6 or on the display 86 of the hull 10 and thereby supply data regarding optimum fuel efficiency throttle opening TH and the like to the operator, or possible to assist operation by transmitting learned navigation data from the terminal 6 to the ECU 22 for display on the display 6a or the display 86 of the hull 10 and thereby supply the operator with data through the ECU 22 regarding optimum fuel efficiency throttle TH and the like, so that the small boat 1 powered by the outboard motor 12 can be operated on a shortest-distance basis to reduce fuel consumption rate to the minimum possible and shorten running time to the minimum possible when used in a commercial basis.

In the system, the navigation data learning unit (4b) is configured to receive throttle opening of the internal combustion engine (52) corresponding to a speed of the small boat (1) from the information communication terminal (6) and learn the fuel consumption rate as the fuel consumption rate corresponding to the received throttle opening. With this, by learning the fuel consumption rate from the throttle opening TH corresponding to the boat speed V (proportional to engine speed), the fuel consumption rate of the engine 52 can be more thoroughly reduced.

In the system, the navigation data learning unit (4b) is configured to receive throttle opening corresponding to the speed of the small boat (1) from the information communication terminal (6) together with a trim angle data of the outboard motor (12) and learn the fuel consumption rate as the fuel consumption rate corresponding to the received throttle opening at the trim angle of the trim angle data. With this, the fuel consumption rate can be learned from the throttle opening TH corresponding to the boat speed V (proportional to the engine speed) and the fuel consumption rate of the engine 52 can be more thoroughly reduced without taking planing of the hull 10 into consideration.

In the system, the AR-display data generating unit (4a) is configured to provisionally determine a navigation route (r1) by drawing a straight line between a departure point (P1) and a destination (P2) of the small boat (1), determine whether the provisionally determined navigation route includes an area to be avoided, define the area as avoid area (r2), and set a modified route (r3) by modifying the provisionally determined navigation route (r1) based on the defined avoid area (r2). With this, in addition to the advantages and effects that running time can be shortened to the minimum possible, collision with other boats and obstacles can be avoided.

In the system, the AR-display data generating unit (4a) is configured to predict disturbances including at least wind and ocean currents on the navigation route (r1), calculate composite force of navigation direction of the small boat (1) and the predicted disturbances, and set the modified route (r3) by modifying the navigation route (r1) to coincide with a direction of the calculated composite force. With this, running time can be more thoroughly shortened.

In the system, the navigation data learning unit (4b) is configured to receive throttle opening of the internal combustion engine (52) corresponding to a speed when the small boat (1) is navigated forward in steady-state. With this, the small boat 1 can steadily be operated on a shortest-distance basis to reduce fuel consumption rate to the minimum possible and shorten running time to the minimum possible.

In the system, the server (4) comprises a server on a cloud (2). With this, the small boat 1 can more steadily be operated on a shortest-distance basis to reduce fuel consumption rate to the minimum possible and shorten running time to the minimum possible.

Although the foregoing explanation is made taking a commercial motorboat of a taxi-boat company as an example, the boat is not limited to this and, for example, can instead be a private motorboat or a fishing boat.

Moreover, while the information communication terminal is a smartphone, it is not limited to a smartphone and can instead be a personal computer or tablet terminal having image taking capability, preferably video image taking capability, or be a mobile telephone having image taking capability, preferably video image taking capability. In addition, these can be connected to and used together with the display 86 at the cockpit seat 24 of the boat 1.

While the present invention has been described with reference to the preferred embodiments thereof, it will be understood, by those skilled in the art, that various changes and modifications may be made thereto without departing from the scope of the appended claims.

What is claimed is:

1. A small boat navigation assist system, comprising:
a small boat equipped with an outboard motor fitted with an internal combustion engine;
an electronic control unit installed in the outboard motor to control operation of the outboard motor;
a server; and
an information communication terminal operable by an operator on the small boat and having;
a display; and
a processor and a memory coupled to the processor;
wherein the processor is configured to:
detect and display on the display a self-position of the small boat;
image ahead of the small boat and display captured forward-looking images on the display; and
communicate with the electronic control unit and the server;
wherein the server comprises:
a computer having processors and memories;
wherein the computer is configured to:
provide information including at least map data and weather data of an ocean area where the small boat navigates;
generate Augmented Reality (AR)-display data for AR-displaying a destination of the small boat in the ocean area at every via-target-point en route on the captured forward-looking images to be displayed on the display, and transmit the AR-display data to the information communication terminal;
sequentially receive navigation data of the outboard motor from the information communication terminal and learn navigation data that enables to reduce a fuel consumption rate of the engine fitted in the outboard motor; and
transmit the learned navigation data to the information communication terminal to assist operation of the operator of the outboard motor in accordance with the transmitted navigation data.

2. The system according to claim 1, wherein the computer is configured, when learning the navigation data, to receive a throttle opening of the internal combustion engine corresponding to a speed of the small boat from the information communication terminal and learn the fuel consumption rate as the fuel consumption rate corresponding to the received throttle opening.

3. The system according to claim 2, wherein the computer is configured, when learning the navigation data, to receive a throttle opening corresponding to the speed of the small boat from the information communication terminal together with trim angle data of the outboard motor and learn the fuel consumption rate as the fuel consumption rate corresponding to the received throttle opening at the trim angle of the trim angle data.

4. The system according to claim 1, wherein the computer is configured, when generating the AR display data, to provisionally determine a navigation route by drawing a straight line between a departure point and a destination of the small boat, determine whether the provisionally determined navigation route includes an area to be avoided, define the area as an avoid area, and set a modified route by modifying the provisionally determined navigation route based on the defined avoid area.

5. The system according to claim 4, wherein the computer is configured, when generating the AR display data, to predict disturbances including at least wind and ocean currents on the navigation route, calculate composite force of navigation direction of the small boat and the predicted disturbances, and set the modified route by modifying the navigation route to coincide with a direction of the calculated composite force.

6. The system according to claim 1, wherein the computer is configured, when learning the navigation data, to receive a throttle opening of the internal combustion engine corresponding to a speed when the small boat is determined to be navigated forward in steady-state.

7. The system according to claim 1, wherein the server comprises a server on a cloud.

8. A small boat navigation assist system, comprising:
a small boat equipped with an outboard motor fitted with an internal combustion engine;
an electronic control unit installed in the outboard motor;
a server comprising a computer having processors and memories; and
a terminal having a display, a processor, and a memory;
wherein the processor causes the terminal to wirelessly communicate with the server;
wherein the processor causes the terminal to image ahead of the small boat to capture forward-looking images, and display the forward-looking images on the display;
wherein the computer causes the server to generate Augmented Reality (AR)-display data to display a destination of the small boat at every via-target-point en route on the forward-looking images, and transmit the AR-display data to the terminal;
wherein the processor causes the terminal to display the AR-display data on the forward-looking images on the display;
wherein the processor causes the terminal to transmit navigation data to the server;
wherein the computer causes the server to sequentially receive the navigation data from the terminal, learn a fuel consumption rate of the engine, determine an optimal throttle opening that maximizes fuel efficiency, and transmit learned navigation data to the terminal that indicates the optimal throttle opening;
wherein the processor causes the terminal to display the optimal throttle opening on the display.

9. The system according to claim 8, wherein:
the computer causes the server to receive an actual throttle opening of the engine corresponding to a speed of the small boat from the terminal, and learn the fuel consumption rate based on the actual throttle opening.

10. The system according to claim 9, wherein:
the computer causes the server to receive trim angle data from the terminal of a trim angle of the outboard motor, and learn the fuel consumption rate based further on the trim angle data.

11. The system according to claim 8, wherein:
the computer causes the server to provisionally determine a navigation route along a straight line between a departure point and the destination of the small boat, determine whether the provisionally-determined navigation route includes an avoid area to be avoided, and set a modified route by modifying the provisionally-determined navigation route based on the avoid area.

12. The system according to claim 11, wherein:
the computer causes the server to predict disturbances including at least wind and ocean currents on the provisionally-determined navigation route, calculate a composite force of a navigation direction of the small boat and the disturbances, and set the modified route by modifying the provisionally-determined navigation route to coincide with a direction of the composite force.

13. The system according to claim 11, wherein:
the avoid area comprises land.

14. The system according to claim 11, wherein:
the avoid area comprises a shoal region.

15. The system according to claim 11, wherein:
the avoid area comprises a region where wave height is apt to be at least as high as a predetermined level unsuitable for navigation.

16. The system according to claim 11, wherein:
the avoid area comprises a landing place for another boat.

17. The system according to claim 8, wherein:
the forward-looking images comprise forward-looking video.

18. The system according to claim 8, wherein:
the server comprises a server on a cloud.

* * * * *